United States Patent [19]

Henry

[11] Patent Number: 5,413,620
[45] Date of Patent: May 9, 1995

[54] PROCESS FOR REINFORCING A GLASS FIBER ATTACHMENT SURFACE AND ARTICLE

[75] Inventor: David Henry, Saint-Michel s/Orge, France

[73] Assignee: Corning Incorporated, Corning, N.Y.

[21] Appl. No.: 130,737

[22] Filed: Oct. 1, 1993

[30] Foreign Application Priority Data

Oct. 2, 1992 [FR] France .................. 92 12173

[51] Int. Cl.$^6$ .............................. C03B 32/00
[52] U.S. Cl. ....................... 65/406; 65/430; 65/60.2; 65/60.5; 156/314; 156/322; 427/402
[58] Field of Search ............ 65/3.1, 3.2, 60.2, 60.5, 65/406, 430; 156/314, 322; 427/402

[56] References Cited

U.S. PATENT DOCUMENTS 4,726,870  2/1988  McWilliams et al. ............. 156/314

FOREIGN PATENT DOCUMENTS 0184926  6/1986  European Pat. Off. .
50006616  of 0000  Japan .
58-142958  8/1983  Japan .
1-157444  9/1989  Japan .

*Primary Examiner*—W. Gary Jones
*Assistant Examiner*—John Hoffmann
*Attorney, Agent, or Firm*—Jay M. Brown

[57] ABSTRACT

The invention relates to a process for adhesively bonding the surface of a humidity sensitive glass article by:
- (A) bringing the surface to be strengthened into contact with an aqueous solution of an acid and a silane; then
- (B) bringing the surface to be strengthened into contact with an alkaline aqueous solution of sodium silicate and/or potassium silicate; and
- (C) drying and hardening the coating applied on the surface of the glass as the result of steps (A) and (B).
- (D) Then adhesively bonding the glass article to another component to form a composite glass article.

Application to the production of optical fiber couplers and composite lenses.

10 Claims, No Drawings

PROCESS FOR REINFORCING A GLASS FIBER ATTACHMENT SURFACE AND ARTICLE

The invention relates to a process for the strengthening of the surface of a humidity sensitive glass article and the resulting strengthened article.

Humidity sensitive glasses are glasses that typically have a low silica content (less than 50% in weight), and relatively elevated amounts of oxides of metal alkalis ($Na_2O$, $K_2O$, $Li_2O$) and/or of fluorine. Humidity sensitive glasses are commonly used in the manufacturing of ophthalmic lenses with high refractive index, photochromic lenses, integrated optical couplers, etc.

It is known to glue a humidity semifive glass component to another component (made of glass or plastic, for example) by means of an adhesive product, to make composite articles, such as composite lenses, or to secure optical fibers to a coupler. The glass is usually pretreated with an adhesion promoter of the functional silane type in order to improve the adhesion of the adhesive to the glass. When the resulting composite articles are subjected to a severe humidity resistance test, for example two weeks or more at 60° C. 92% relative humidity, weakness of the adhesive attachment is frequently observed, due to a de-cohesion of the glass under the interface itself, caused by the hydrolysis of the glass, as the interface is not sufficiently impermeable to humidity in spite of the silane treatment.

Therefore, there is a need for a process that would permit the remedy of this weakness of humidity sensitive glasses and, thus, the broadening of their scope of application.

The invention precisely aims to satisfy this need.

The invention relates to a process for strengthening the surface of a humidity sensitive glass article, characterized in that it comprises:

(A) bringing the surface to be strengthened into contact with an aqueous solution of an acid and a silane; then
(B) bringing the surface to be strengthened into contact with an alkaline aqueous solution of sodium silicate and/or potassium silicate; and
(C) drying and hardening the coating applied on the surface of the glass as the result of steps (A) and (B).

In the preferred embodiment of Step (A), the aqueous solution of an acid and a silane comprises an aqueous solution of an acid and the product of the hydrolysis of a silane containing at the same time hydrolyzable groups linked to the silicon and a functional group insensitive to the acid.

The invention also relates to the humidity sensitive glass articles of which at least part of the surface has been strengthened with the process of the invention.

The glass surface to be treated must be carefully cleaned beforehand to insure that no trace of greasy substances, dirt or other contaminants will hinder the realization of the bringing into contact steps (A) and (B).

The silane used in step (A) can be any silane having hydrolyzable groups linked to the silicon that can generate silanol groups, such as alcoxy or halogen groups, and a functional group insensitive to the acid used for the preparation of the aqueous solution used in step (A), such as an acrylic, methacrylic, epoxy or vinyl group. These silanes are well-known and commercially available from various sources. We can mention the following ones, for illustration purpose only:

Gamma-methacryloxypropyltrimethoxysilane of formula

available under the trade names Z-6030 (from Dow Coming Corporation, Midland, Mich. 48686-0994) or A-174 (from Union Carbide Corporation, New York, N.Y.).

Gamma-glycidoxypropyltrimethoxysilane of formula

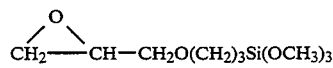

available under the trade names Z-6040 (from Dow Coming Corporation) or A-187 (from Union Carbide Corporation).

Vinyl-tri(methoxyethoxy)silane of formula

available under the trade names Z-6082 (from Dow Coming Corporation) or A-172 (from Union Carbide Corporation).

The preparation of the aqueous solution used in step (A) can be made quickly by adding silane to water while stirring at room temperature, then by acidifying the resulting cloudy dispersion. Then, one lets the hydrolysis occur until a clear solution is obtained. The proportion of added silane can represent from 0.1% to 10%, preferably from 0.5% to 3%, of the total weight of water+silane. For the acidification, an organic acid such as acetic acid, or a mineral acid such as HCl can be used. The pH produced by the acidification is not critical and can range from 2 to 7, preferably from 3 to 5. The time necessary so that the hydrolysis of the silane reaches a sufficient degree—indicated by a transparent solution—can range from a few tens of minutes to a few hours. Usually a duration of the hydrolysis of the order of 1 to 2 hours is satisfactory.

The glass surface to be treated can be brought into contact with the acid aqueous solution of the product of the hydrolysis of the silane by any appropriate technique, but the easiest way is to immerse the surface to be treated in a bath of this aqueous solution. The duration of the immersion is not very critical and, for example, duration of immersion from 30 to 300 seconds is usually satisfactory.

After that, the glass surface is brought into contact with an alkaline aqueous solution of sodium silicate and/or potassium silicate. This contact can be made in various ways. One of these consists of adding to the acid bath used in step (A), and in which the article to be treated is present, a solution of the silicate, until an alkaline pH is obtained. As a variation, this contact could be made by immersing the glass article in a second bath, distinct from the acid bath, made of an alkaline aqueous solution of sodium silicate and/or potassium silicate.

The pH of the alkaline solution of silicate is not very critical, but a pH of approximately 7 to 9 is preferred.

The duration for maintaining the glass surface in contact with the silicate solution is not very critical either, but durations from about 10 to 180 seconds have usually proved satisfactory.

Afterwards, the article is removed from the silicate bath and then submitted to heating in order to dry and harden the coating applied on the glass surface to be strengthened as the result of steps (A) and (B). As the coating to be dried and hardened is somewhat sensitive to oxidation, this step should be carried out at moderate temperature, for example 50°–60° C. at the most, in normal atmosphere. More elevated temperature, for example 100° C. or more, can be used in an inert atmosphere, for example in nitrogen. The heating duration can range from a few minutes to a few hours, depending on operating conditions.

Although the present invention is not linked to any theory, it is considered at present that the treatment by silane with an acid pH has the effect of producing—SiOH groups both on the glass surface, due to the attack of the glass, and on the silane, as a consequence of its hydrolysis; then the treatment by the silicate with an alkaline pH results in increasing the silica content of the surface layer of the glass, therefore reducing its sensitivity to humidity; and also of bringing about a condensation of the —SiOH groups firmly fixing the silane to the glass. The result of all this is a glass article whose treated surface is mechanically strengthened due to its lesser sensitivity to humidity, and which is well suited to being glued to another component by polymerisable or reticulable adhesive means, due to the presence of the functional group of the silane that remains available to participate in the polymerization or reticulation of the adhesive employed.

The process of the invention is particularly useful to strengthen glass surfaces that have been submitted to mechanical abrasion, ground down for example, and/or that present microcracks, provided that the surface irregularities and/or the microcracks are leveled and/or filled to a certain extent when the process of the invention is carried out.

The following usable adhesives can be mentioned among others, acrylic adhesives, polyurethane modified acrylics, epoxy modified acrylics, epoxies, etc.

The glass articles that are treated according to the invention are particularly useful in the manufacturing of couplers for optical fibers, in particular of "planar" type couplers prepared by a process comprising one or more ion-exchange operations in a molten salt bath. It is common to glue optical fibers to a coupler by means of a photo-hardenable acrylic adhesive, and a common defect of the resulting structure is the weakness of the adhesive attachments after the coupler has been exposed to a humid atmosphere. The process of the invention allows one to solve this problem.

Other potential applications for the invention are in the field of manufacturing composite ophthalmic lenses (photochromic glass-plastics) where the invention allows one to strengthen the adhesive attachment between the two materials in humid conditions that normally lead to the appearance of defects at the interface.

Yet another potential application is the preparation, from a glass frit, of strengthened particulate filler made of humidity sensitive glass.

The following non-limiting examples are given in order to illustrate the invention.

In these examples the surface condition of the glass articles is characterized by the value of the contact angle made by a drop of water with the glass surface.

Example 1

One takes planar couplers made of humidity sensitive glass, available under the trade name A 6365 from Corning Incorporated, Corning, N.Y. 14831 or FK3 from Schott Optical Glass, Inc., Duryea, Pa. 18642, with the following composition, in weight % of oxide: 47.8% $SiO_2$, 17.4% $B_2O_3$, 14.6% $Al_2O_3$, 12.4% $K_2O$, 2.2% $Na_2O$ and 5.6% F, and that have undergone ion-exchange operations in molten salts baths to create optical paths. These couplers have the shape of a small bar of 40 mm length, 3 mm width and 0.8 mm thickness.

First, these couplers are cleaned by being immersed for 30 minutes in boiling ethanol. The couplers are dried for 16 hours at 50° C. and stored in a desiccator before use. The surface of the cleaned glass has a contact angle with water of 31°±4°. The first coupler (reference point of the prior art) as a reference is treated by immersion for 2 minutes in a solution of hydrolyzed silane, prepared from, in weight %, 98% ethanol, 1% water and 1% A187 silane (gamma-glycidoxypropyltrimethoxysilane), then by drying for 1 hour at 105° C.

The other couplers are treated by immersion for 2 minutes in a bath that had been prepared as follows: 98.9% water and 1.1% A174 silane (gamma-methacryloxypropyltrimethoxysilane), in weight %, are mixed, the pH is adjusted at 4.5 with the aid of acetic acid, and the resulting mixture is aged for 2 hours so that hydrolysis takes place (the initially cloudy mixture clears up after 20 minutes).

After the 2-minute treatment, an aqueous solution of sodium silicate (26% $SiO_2$, 8% $Na_2O$; density 1.33, commercialized by the corporation PROLABO, 12, rue Pelée, 75011, Paris, France) is added to the bath containing the couplers, until the pH of the bath reaches 8. The couplers are left in the alkaline silicate bath for 2 minutes, then are removed from the bath, the excess of liquid on the couplers is removed by blowing a nitrogen jet, and finally the couplers are dried for 2 hours at 50° C. in an oven.

The treated surfaces of the couplers have a contact angle with water of 82°±4°.

The couplers treated according to the invention, the coupler reference for the prior art, and a reference coupler that has not undergone any treatment are covered with a drop of about 2 mm diameter of a photocurable acrylic adhesive commercially available under the trade name LC050 from Imperial Chemical Industries, Runcorn, Cheshire WA7 4QF, England.

Each drop is hardened by exposure to an ultraviolet light source (470 nm) for 60 seconds.

We have then measured, with the help of an Instron testing machine, the stress necessary to detach the hardened drop with the force applied parallel to the glass-adhesive interface. The test has been carried out on dry couplers as well as on couplers that have been subjected to an exposure of 2 weeks at 60° C. and 92% relative humidity. The obtained results are summarized in the following Table I.

TABLE I

| Sample | Adhesion, $MPa/mm^2$ | |
| --- | --- | --- |
| | In a Dry Condition | After Exposure to Humidity |
| Reference Without Treatment | 4 | 0 |
| Reference Treated According to the Prior Art | 10 | 2 |

TABLE I-continued

| | Adhesion, MPa/mm² | |
|---|---|---|
| Sample | In a Dry Condition | After Exposure to Humidity |
| According to the Invention | 40 | 22 |

In the case of the reference samples without treatment or treated in accordance with the prior art, the break is interfacial or cohesive, very close to the interface, in the glass. In the case of the samples in accordance with the invention; a break in the glass is observed, but in deeper with respect to the interface. This demonstrates that the treatment of the invention fulfills a strengthening effect on the interface, and that this interface becomes the toughest part of the coupler.

Example 2

Following the general operating method described in Example 1 for the preparation of samples in accordance with the invention, the concentration, in weight %, of the A 174 silane is made to vary in order to study the effect of the variation of this concentration on the value of the wetting angle by water that characterizes the surface condition of the glass.

The obtained results are as follows:

| Concentration of Silane, in Weight % | Wetting Angle |
|---|---|
| 0 | 34 |
| 0.5 | 86 |
| 1.0 | 87 |
| 3.0 | 87 |

One can see that concentrations in silane as low as 0.5% are sufficient to obtain a substantial effect. It is even considered that concentrations as low as 0.1% in weight of silane would be sufficient to obtain a significant effect.

Example 3

This example illustrates the strengthening effect produced by the process of the invention on various types of materials, and also compares the treatment of the invention with various reference treatments.

In addition to the A 6365 glass described in example 1, samples of a photochromic glass and fibers in pure silica have also been treated. The composition of the photochromic glass (refractive index: 1.6) was the following, in weight % based on the oxides: 48% $SiO_2$, 5.9% $BaO$, 14.8% $B_2O_3$, 5% $K_2O$, 1.72% $La_2O$, 1.06% $Na_2O$, 8.05% $Nb_2O_3$, 1.8% $SrO$, 5.3% $TiO_2$ and 7.4% $ZrO_2$, plus the usual photochromic and coloring agents.

The samples have been treated in accordance with the invention (A 174+Silicate) with the operating method described in Example 1. The reference treatment with A 187 silane has also been carried out as described in Example 1. The reference treatment with A 174 silane alone has been performed the same as the treatment with A187 silane, merely by substituting A 174 silane for A 187 silane.

The adhesion in a dry state of a hardened adhesive drop on the samples of A 6365 glass and of photochromic glass has been determined as described in Example 1. In the case of the silica fibers, the technique described in Composites Science and Technology, Vol. 42 (1991), Page 207 (Elsevier Applied Science Publishers Ltd., Crown House, Linton Rd., Barking, Essex IG11 8JU, England) has been followed.

The results obtained are as follows in Table II:

TABLE II

| Treated Material | A 187, Reference | Treatment A 174 Alone | A 174 + Silicate (according to the invention) |
|---|---|---|---|
| A 6365 Glass | 10 | — | 40 |
| Photochromic Glass | — | 13 | 17 |
| Silica Fibers* | 22 | 34 | 20 |

*outside the invention

As one can see, the strengthening effect of the treatment of the invention depends not only on the silica content, but also on the levels of alkaline oxides and fluorine, which weaken the adherence of the network as they are increased.

Thus, if the results of strengthening are excellent for a glass such as A 6365 with a low silica content and high levels of alkaline oxides and fluorine, these results are not as pronounced for the photochromic glass whose silica content is similar, but which contains less alkaline oxides. As for the effect on pure silica, it is harmful rather than beneficial.

Needless to say, the described embodiments are merely examples, and they can be modified, in particular by substituting technical equivalents, without thereby departing from the scope of the invention.

I claim:

1. A process for adhesively bonding the surface of a humidity sensitive glass article, said article comprising less than about 50% by weight of silica, to the surface of a component to form a composite article, characterized in that it comprises:
    (A) bringing the surface of the humidity sensitive glass article into contact with and thereby coating said surface with an aqueous solution of an acid and a silane; then
    (B) bringing the surface of the humidity sensitive glass article into contact with and thereby coating said surface with an alkaline aqueous solution of a silicate selected from the group consisting of sodium silicate, potassium silicate and mixtures thereof; then
    (C) drying and hardening the coating applied on the surface of the humidity sensitive glass article as the result of steps (A) and (B), yielding a strengthened surface of the humidity sensitive glass article; then
    (D) applying an adhesive composition between the strengthened surface of the humidity sensitive glass article and the surface of the component; and then
    (E) bringing the surface of the component into contact with the strengthened surface of the humidity sensitive glass article and thereby adhesively bonding the surface of the component and the strengthened surface together to form a composite article.

2. The process of claim 1, characterized in that said aqueous solution of an acid and a silane comprises an aqueous solution of an acid and the product of the hydrolysis of a silane containing at the same time hydrolyzable groups linked to the silicon and a functional group insensitive to the acid, and wherein the hydrolyzable groups of the silane are selected from the alcoxy and halogen groups, and the functional group of the silane is selected from the acrylic, methacrylic, epoxy and vinyl groups.

3. The process of claim 2, characterized in that the silane is selected from among gamma-methacryloxypropyltrimethoxysilane, gamma-glycidoxypropyltrimethoxysilane and vinyl-tri(methoxyethoxy)silane.

4. The process of claim 1, characterized in that the acid aqueous solution used in step (A) has a pH of 3 to 5.

5. The process of claim 1, characterized in that the alkaline aqueous solution used in step (B) has a pH of 7 to 9.

6. The process of claim 1, characterized in that the proportion of silane ranges from 0.1% to 10% in weight.

7. The process of claim 6, characterized in that said proportion of silane ranges from 0.5% to 3% in weight.

8. A composite article manufactured by a process as defined in any one of claims 1 to 7.

9. A composite article according to claim 8, wherein the humidity sensitive glass article is an optical fiber coupler.

10. A composite article according to claim 8, wherein the humidity sensitive glass article is an ophthalmic lens intended for the production of a glass-plastic composite lens.

* * * * *